(12) United States Patent
Endo et al.

(10) Patent No.: US 6,844,987 B2
(45) Date of Patent: Jan. 18, 2005

(54) ZOOM LENS SYSTEM FOR COVERING SUPERWIDE-ANGLE AREA

(75) Inventors: Hiroshi Endo, Asaka (JP); Michio Cho, Asaka (JP); Kazunaga Shimizu, Suwa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 16 days.

(21) Appl. No.: 10/614,135

(22) Filed: Jul. 8, 2003

(65) Prior Publication Data

US 2004/0051964 A1 Mar. 18, 2004

(30) Foreign Application Priority Data

Sep. 11, 2002 (JP) ........................................ 2002-266031

(51) Int. Cl.[7] ........................... G02B 13/04; G02B 15/14
(52) U.S. Cl. ........................................ 359/692; 359/752
(58) Field of Search ................................ 359/676, 680, 359/682, 692, 752, 753, 761, 776, 756

(56) References Cited

U.S. PATENT DOCUMENTS 5,610,767 A   3/1997   Ito

2001/0036021 A1 * 11/2001 Enomoto ..................... 359/692
2002/0041449 A1 *  4/2002 Eguchi et al. .............. 359/692

FOREIGN PATENT DOCUMENTS

| JP | 6-82696 | 3/1994 |
| JP | 7-146439 | 6/1995 |
| JP | 2001-343586 | 12/2001 |

* cited by examiner

*Primary Examiner*—Georgia Epps
*Assistant Examiner*—Alicia M. Harrington
(74) *Attorney, Agent, or Firm*—Young & Thompson (57) ABSTRACT

A zoom lens includes first to fourth lenses in order from an object side. The first lens has negative refracting power and a concave surface thereof faces the object side. The second and fourth lenses have positive refracting power. The third lens has negative refracting power. The zoom lens as a whole is constituted of a first lens group having positive refracting power, and a second lens group having negative refracting power. The following conditions are satisfied, $-2.7<fs/f1<-1.7$ $-1.1<f1/f2<-0.9$ and $1.0<r1/f1<3.0$, wherein fs denotes a focal length of the overall system at a wide-angle end, f1 and f2 denote focal lengths of the first and second lenses respectively, and r1 denotes a radius of curvature at the object side of the first lens.

10 Claims, 7 Drawing Sheets

FIG. 1B (TELEPHOTO END)

FIG. 1A (WIDE-ANGLE END)

FIG. 2A

WIDE-ANGLE END

FIG. 2B

MIDDLE

FIG. 2C

TELEPHOTO END

FIG. 3A

WIDE-ANGLE END

F5.6     $\omega = 41.2°$     $\omega = 41.2°$

SPHERICAL ABERRATION     ASTIGMATISM     DISTORTION

FIG. 3B

MIDDLE

F6.3     $\omega = 31.9°$     $\omega = 31.9°$

SPHERICAL ABERRATION     ASTIGMATISM     DISTORTION

FIG. 3C

TELEPHOTO END

F7.8     $\omega = 24.3°$     $\omega = 24.3°$

SPHERICAL ABERRATION     ASTIGMATISM     DISTORTION

FIG. 4A

WIDE-ANGLE END

FIG. 4B

MIDDLE

FIG. 4C

TELEPHOTO END

FIG. 5A

WIDE-ANGLE END

F5.6 ω = 41.2° ω = 41.2°

SPHERICAL ABERRATION — ASTIGMATISM — DISTORTION

FIG. 5B

MIDDLE

F6.0 ω = 31.9° ω = 31.9°

SPHERICAL ABERRATION — ASTIGMATISM — DISTORTION

FIG. 5C

TELEPHOTO END

F6.8 ω = 24.3° ω = 24.3°

SPHERICAL ABERRATION — ASTIGMATISM — DISTORTION

FIG. 6A

WIDE-ANGLE END

F5.6     ω = 41.2°     ω = 41.2°

SPHERICAL ABERRATION     ASTIGMATISM     DISTORTION

FIG. 6B

MIDDLE

F6.0     ω = 31.9°     ω = 31.9°

SPHERICAL ABERRATION     ASTIGMATISM     DISTORTION

FIG. 6C

TELEPHOTO END

F7.8     ω = 24.3°     ω = 24.3°

SPHERICAL ABERRATION     ASTIGMATISM     DISTORTION

FIG. 7A

WIDE-ANGLE END

FIG. 7B

MIDDLE

FIG. 7C

TELEPHOTO END

ZOOM LENS SYSTEM FOR COVERING SUPERWIDE-ANGLE AREA

BACKGROUND OF THE INVENTION

1. Field of the Invention

The present invention relates to a zoom lens system of two lens groups, which is suitable for a taking lens of a camera to cover a superwide-angle area.

2. Description of the Related Art

A zoom lens to be used for a compact camera has a variable-power ratio of about two times and is different from a zoom lens to be used for a single-lens reflex camera. As to the zoom lens of the compact camera, since a long back focus is not necessary, the lens structure thereof is a two-group structure comprising a positive first lens group and a negative second lens group, which are arranged in order from an object side. In virtue of this structure, it is possible to shorten the total length and the back focus. Meanwhile, it is known that a wide angle of view is obtained without enlarging a lens diameter when an object-side surface of a first lens is a concave surface. By adopting this kind of the lens structure, both of downsizing and the wide angle of view are realized (see the following patent documents, for instance).

[Patent Document 1]

Japanese Patent Laid-Open Publication No. 6-82696

[Patent Document 2]

Japanese Patent Laid-Open Publication No. 2001-343586

[Patent Document 3]

Japanese Patent Laid-Open Publication No. 7-146439 (Japanese Patent Publication No. 3264067)

With respect to the conventional lenses, however, the overall angle of view at a wide-angle side is about 75°. When applying a wider-angle lens, it is impossible to sufficiently correct various aberrations of marginal lumination, distortion and so forth.

SUMMARY OF THE INVENTION

In view of the foregoing, it is a primary object of the present invention to provide a zoom lens of small size in which an overall angle of view is 80° or more.

It is a second object of the present invention to provide a zoom lens of small size in which various aberrations are sufficiently corrected.

In order to achieve the above and other objects, the zoom lens according to the present invention comprises a first lens group having positive refracting power and a second lens group having negative refracting power, which are arranged in order from an object side. The first lens group and the second lens group are moved to reduce an interval between them so that magnification is changed from a wide-angle end to a telephoto end. The first lens group includes first to fourth lenses in order from the object side. The first lens has negative refracting power and a concave surface thereof faces the object side. The second lens has positive refracting power. The third lens has negative refracting power. The fourth lens has positive refracting power. The zoom lens of the present invention satisfies the following conditions.

$$-2.7 < fs/f1 < -1.7 \quad (1)$$

$$-1.1 < f1/f2 < -0.9 \quad (2)$$

fs: Focal Length of Overall System at Wide-Angle End
f1: Focal Length of the First Lens
f2: Focal Length of the Second Lens The zoom lens is preferable to further satisfy the following condition.

$$1.0 < r1/f1 < 3.0 \quad (3)$$

r1: Radius of Curvature at Object Side of the First Lens

Moreover, both faces of the second lens are preferable to be a convex surface and at least one of the faces is preferable to be a glass lens of an asphere.

Furthermore, the third lens and the fourth lens are preferable to be a cemented lens.

According to the present invention, it is possible to obtain the zoom lens, which is compact and has the angle of view of 80° or more at the wide-angle end.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

A zoom lens according to the present invention is of a telephoto type comprising a positive first lens group and a negative second lens group, in order to shorten a total length extending from a lens surface, which is nearest to a subject, to a focal plane. When zooming is performed from a wide-angle end toward a telephoto end, the first and second lens groups are moved to an object side to reduce an interval thereof.

In the present invention, the first lens group I is constituted of a first lens G1 having negative refracting power, a second lens G2 having positive refracting power and an asphere, a third lens G3 having negative refracting power, and a fourth lens G4 having positive refracting power. An effective diameter of the first lens is likely to be large as an angle of view at the wide-angle end becomes wider. Notwithstanding, by making an object side of the first lens a concave surface, it is possible to widen the angle of view in a state that the lens diameter is kept in a small size. However, by comparison with another case in that a convex surface is directed to the object side, an angle of refraction becomes large as the axial ambient light nears to a peripheral portion of a picture. Accordingly, coma and astigmatism increase. In view of this, the first lens is set so as to satisfy the following condition (1). By doing so, it is possible to strike a balance between utility and performance.

$$-2.7 < fs/f1 < -1.7 \quad (1)$$

The condition (1) concerns a power of the first lens. Upon exceeding the upper limit of the condition (1), negative curvature of field and positive distortion increase due to lack of lens power. As to the main light of the wide view angle becoming incident on a stop surface, an angle thereof is large relative to an optical axis. Thus, vignetting is caused due to thickness of a stop when an aperture is small. Meanwhile, upon falling below the lower limit, it becomes difficult to correct aberration with another lens due to an excess of lens power. Moreover, it is likely to be influenced by fabrication errors. Incidentally, fs denotes a focal length of the overall system at the wide-angle end, and f1 denotes a focal length of the first lens.

Further, the second lens is set so as to satisfy the following condition (2). By doing so, it is possible to properly correct various aberrations.

$$-1.1 < f1/f2 < -0.9 \quad (2)$$

The condition (2) concerns power balance of the first lens and the second lens. In the zoom lens according to the present invention, the power of the first lens is set so as to be high for the purpose of obtaining the wide angle of view. In order to correct the aberration generated in the first lens, it is necessary to satisfy the condition (2). Upon exceeding the upper limit of the condition (2), the power of the second lens becomes insufficient in comparison with the first lens. Thus, it is difficult to correct the aberration generated in the first lens. Meanwhile, upon falling below the lower limit, the power of the second lens becomes too great so that it is difficult to strike a balance between aberrations of the third lens and the fourth lens.

The following condition (3) concerns a radius of curvature regarding the object side of the first lens. This radius of curvature is denoted by r1.

$$1.0 < r1/f1 < 3.0 \quad (3)$$

Upon exceeding the upper limit of the condition (3), the radius of curvature becomes large. In other words, the lens diameter becomes large so that it is difficult to secure marginal lumination at the wide-angle end. Meanwhile, upon exceeding the lower limit, the radius of curvature becomes too small. Due to this, coma and astigmatism increase so that it becomes difficult to correct them with the second lens. With respect to luminous flux of the wide view angle, an amount of light rays passing a side, that is separated from an optical axis on an entrance pupil, becomes too great on a stop surface, and luminous flux surface density lowers on the stop surface. Thus, the marginal lumination lowers when the aperture is small.

The second lens has an asphere in order to mainly correct spherical aberration and coma. However, since strong power is necessary, the radius of curvature becomes too small in a case of a plastic asphere. As a result, various aberrations and sensitivity for the fabrication error increase. In view of this, it is desirable to use a glass asphere having a high refractive index, preferably having a refractive index of 1.6 or more. In the case of the plastic lens, it is difficult to prevent movement of focal point caused by changes of temperature and humidity.

Further, it is desirable to satisfy the following condition (4).

$$N1 > N2 \quad (4)$$

In this condition, N1 and N2 denote refractive indexes of the first and second lenses respectively. Upon departing from the scope of the condition (4), Petzval's sum becomes too small. When the astigmatism is small, curvature of field is excessively corrected.

The third lens and the fourth lens are desirable to be a cemented lens. In virtue of the cemented lens, it is possible to correct chromatic aberration, spherical aberration and coma without strictly restraining the fabrication error.

Furthermore, it is preferable that the third lens and the fourth lens satisfy the following conditions (5) and (6).

$$v3 < v4 \quad (5)$$

$$N3 > N4 \quad (6)$$

In these conditions, v3 and v4 are Abbe numbers of the third and fourth lenses respectively, and N3 and N4 are refractive indexes of the third and fourth lenses respectively. Upon departing from the scope of the condition (5), it is difficult to correct the axial chromatic aberration. Upon departing from the scope of the condition (6), it is difficult to correct the spherical aberration.

The second lens group comprises a positive fifth lens G5 and a negative sixth lens G6, which are arranged in order from the object side. When the view angle of the wide-angle end is widened, the negative lens nearest to an image side is likely to have a large effective diameter, similarly to the first lens. In view of this, a positive aspherical lens is disposed at an object side of the negative lens so as to strengthen the positive power at the outside of the axis. By reducing an incidence amount of the negative lens, the marginal lumination may be obtained without enlarging the lens diameter. It is desirable that Abbe number of the fifth lens is 40 or more. In a case that this Abbe number is less than 40, it is difficult to correct transverse chromatic aberration of the wide-angle side. Refracting power of this lens is small so that it is possible to use a plastic.

EXAMPLE 1

Figure 1A:
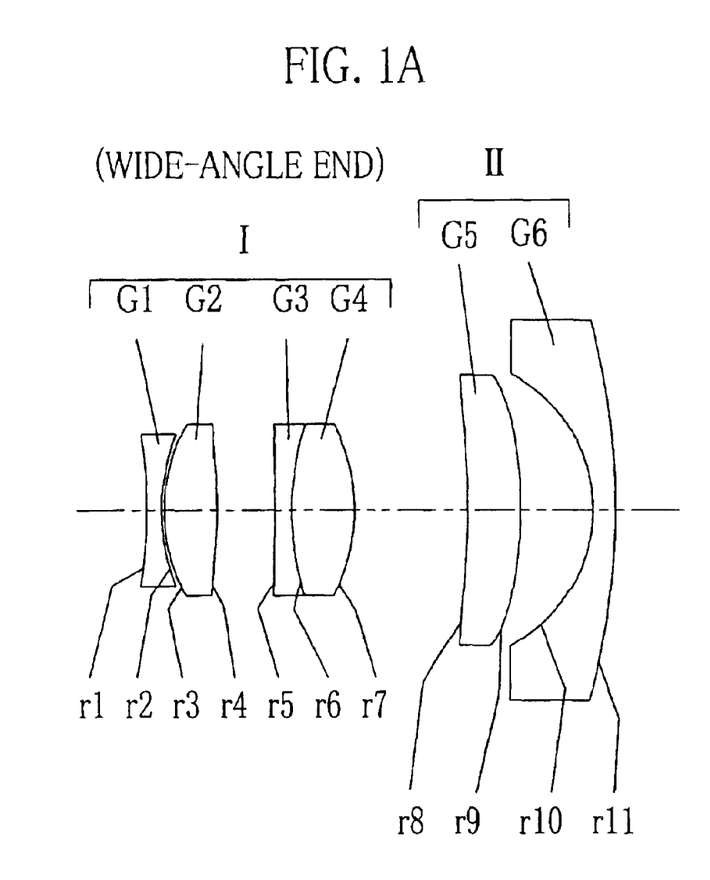
FIGS. 1A and 1B are sectional views showing a zoom lens according to the present invention.
Figure 1B:
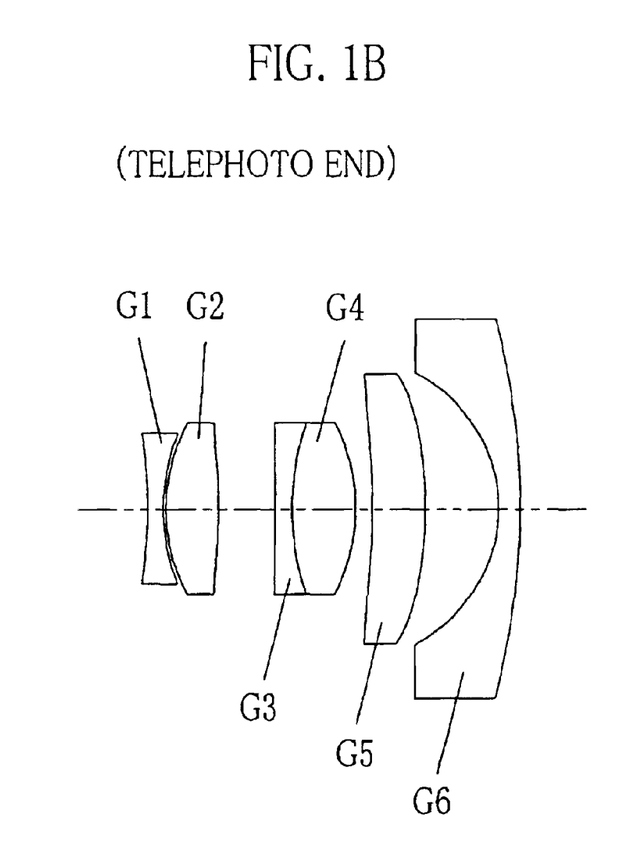
Figure 2A:
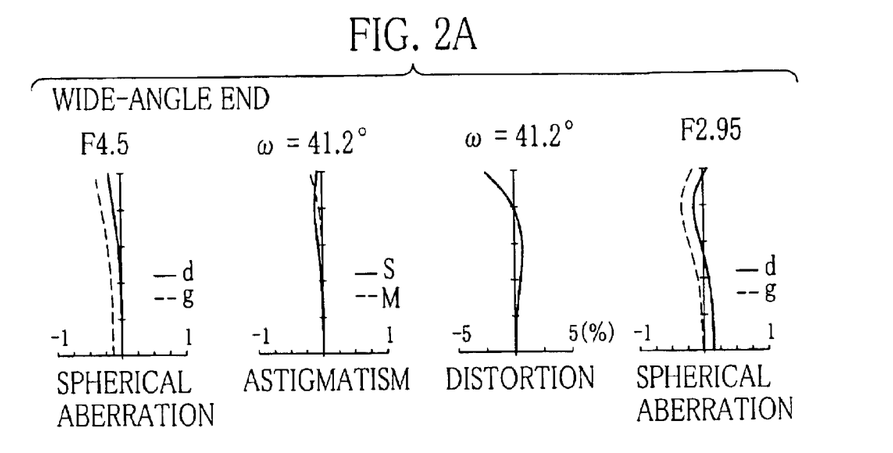
FIGS. 2A to 2C are aberration charts of Example 1.
Figure 2B:
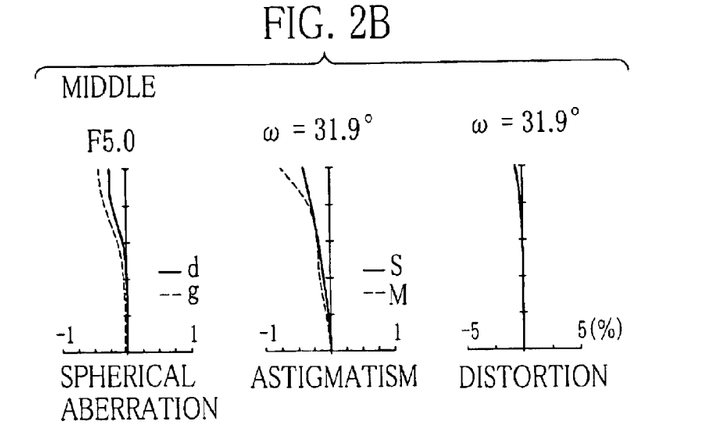
Figure 2C:
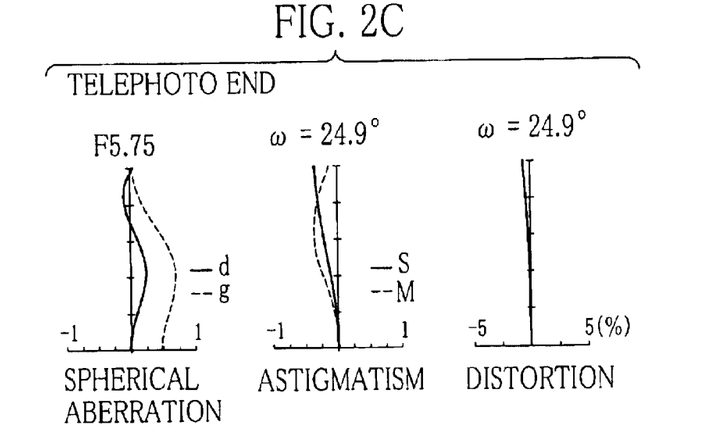

Table 1 shows values of R (mm), D (mm), N and v, wherein R denotes a radius of curvature of each lens surface, D denotes central thickness of each lens and airspace between the respective lenses, N denotes a refractive index at the d-line of each lens, and v denotes the Abbe number. Incidentally, in the table, each number written in a column of the surface (SUR.) represents the order succeeding from the object side. With respect to "*", it is described later. Meanwhile, FIGS. 1A and 1B show sectional views of the lenses and FIGS. 2A to 2C show various aberrations of a wide-angle end, a middle focal length, and a telephoto end. By the way, in the attached drawings, d and g denote the spherical aberrations at the d-line and the g-line respectively. Further, S denotes a sagittal image surface, and M denotes a meridional image surface.

TABLE 1

| | SUR. | R | D | N | v |
|---|---|---|---|---|---|
| | 1 | −27.598 | 0.90 | 1.72825 | 28.3 |
| | 2 | 12.388 | 0.15 | | |
| * | 3 | 10.683 | 3.00 | 1.68410 | 31.3 |
| * | 4 | −29.152 | 3.30 | | |
| | 5 | −166.352 | 1.00 | 1.84666 | 23.8 |
| | 6 | 16.913 | 3.60 | 1.72342 | 38.0 |
| | 7 | −11.383 | D7 | | |
| * | 8 | −39.993 | 3.10 | 1.52470 | 56.2 |
| * | 9 | −24.276 | 4.15 | | |
| | 10 | −8.940 | 1.30 | 1.80420 | 46.5 |
| | 11 | −41.979 | | | |

D7 means a value varying in accordance with zooming. Table 2 shows D7, focal length f, F-number F, back focus FB and half angle of view ω, wherein W denotes the wide-angle end, M denotes the middle focal length, and T denotes the telephoto end.

TABLE 2

|     | W    | M     | T     |
| --- | ---- | ----- | ----- |
| D7  | 6.57 | 3.28  | 0.99  |
| f   | 24.7 | 34.8  | 48.5  |
| F   | 4.5  | 5.0   | 5.75  |
| FB  | 7.05 | 17.05 | 30.65 |
| ω   | 41.2 | 31.87 | 24.3  |

In Table 1, "*" written at the left side of the surface number means that the surface concerned is the aspheric surface. The shape thereof is expressed by the following equation in rectangular coordinates, the original of which is the vertex of the surface and an X-axis of which is in an optical-axis direction. In the following Table, "E+i" represents "$\times 10^i$" and "E-i" represents "$\times 10^{-i}$".

$$X = \frac{\frac{Y^2}{R}}{1 + \sqrt{1 - (1+K)\frac{Y^2}{R^2}}} + AY^4 + BY^6 + CY^8 + DY^{10} + EY^{12}$$ [EQUATION 1]

Y: Height from the Optical Axis
R: Radius of Curvature of the Vertex
K: Conic Constant
A, B, C, D and E: Aspheric Coefficients

TABLE 3

| SUR. | K | A | B | C | D | E |
| --- | --- | --- | --- | --- | --- | --- |
| 3 | 9.47240E−02 | −1.18940E−04 | 1.97590E−06 | −7.89970E−08 | 7.09390E−09 | −1.39760E−10 |
| 4 | −1.51134E+00 | 1.74700E−04 | 1.16430E−06 | 9.95650E−08 | 3.64390E−09 | −8.20770E−11 |
| 8 | 1.31540E+00 | 3.38660E−05 | 2.14130E−06 | −3.78340E−08 | 3.48640E−10 | −1.68970E−12 |
| 9 | −1.19213E−01 | −8.09040E−05 | 1.80570E−06 | −6.53940E−08 | 9.32790E−10 | −7.88280E−12 |

A position of the stop is optional. However, it is desirable to dispose the stop between the fourth surface and the fifth surface in order to secure the marginal lumination at the time of small aperture.

As shown at the right side of FIG. 2A, the aberrations except the marginal lumination are satisfactorily corrected even if the diameter is further enlarged at the wide-angle end. Thus, although the F-number of the wide-angle end is 4.5 in this example, the F-number may be about 2.95 in night-scene photographing or the like, wherein the marginal lumination is not cared. Especially, the astigmatism and the coma are satisfactorily corrected at a periphery of a picture so that it is possible to depict a point light source having the bright background, without deforming a shape thereof.

When a person is photographed with the background of night scenes, flashlight is emitted at a position of F4.5 on the way to opening a shutter. After that, the shutter is opened until F2.95. In virtue of this, the background is photographed in the brightness of F2.95, and the flashlight is emitted at F4.5 wherein the marginal lumination is sufficient. Thus, it is possible to obtain a depiction in which both of the subject and the background are satisfactory.

EXAMPLE 2

Figure 3A:
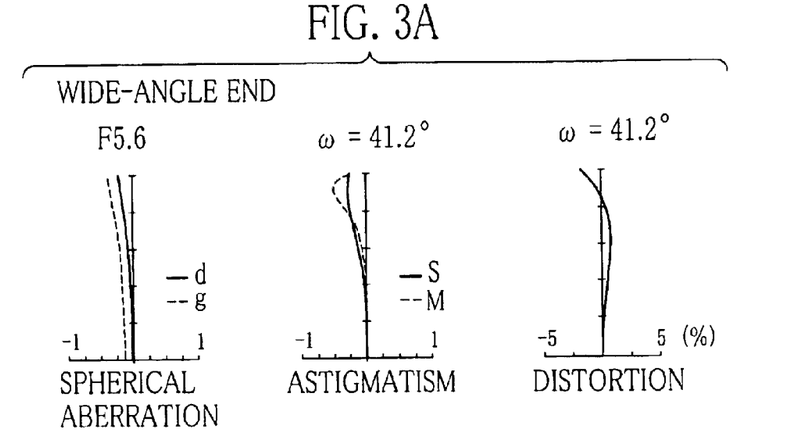
FIGS. 3A to 3C are aberration charts of Example 2.
Figure 3B:
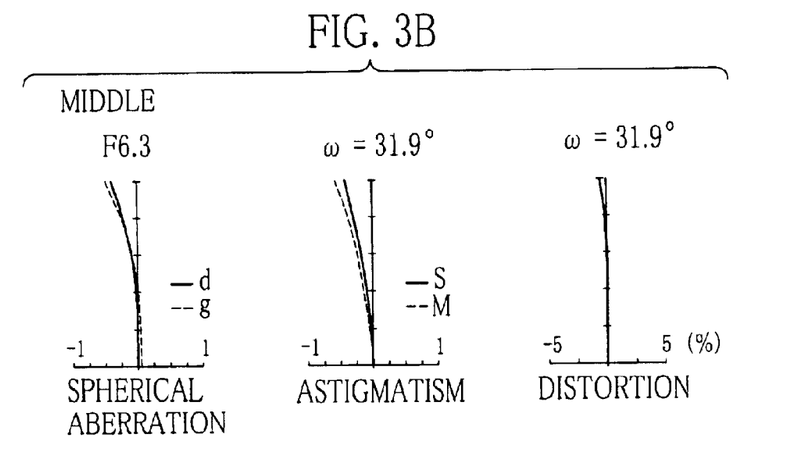
Figure 3C:
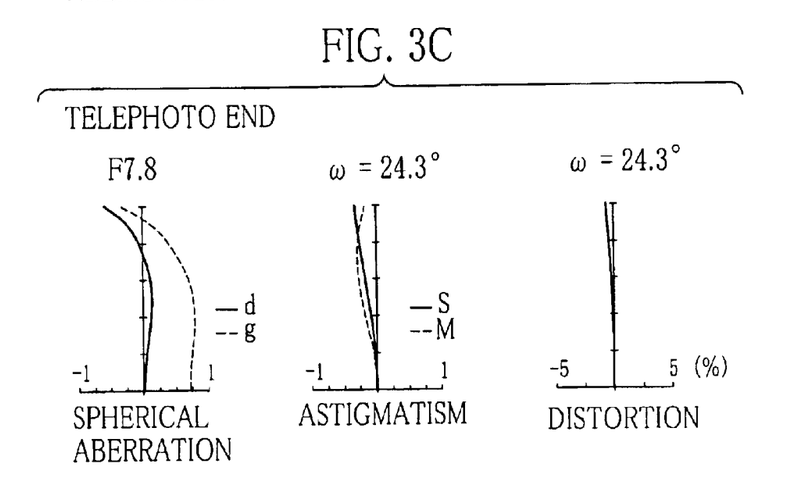

A zoom lens of Example 2 has a similar structure with that of Example 1. Table 4 shows values of the respective lens surfaces of Example 2. Table 5 shows data of each zooming step, and Table 6 shows aspheric coefficients. Meanwhile, FIG. 1 shows sectional views of the lenses, and FIG. 3 shows various aberrations of the respective zooming steps.

TABLE 4

|  | SUR. | R | D | N | ν |
| --- | --- | --- | --- | --- | --- |
|  | 1 | −27.804 | 0.90 | 1.74400 | 44.9 |
|  | 2 | 12.361 | 0.15 |  |  |
| * | 3 | 10.724 | 3.00 | 1.69350 | 53.2 |
| * | 4 | −28.950 | 3.30 |  |  |
|  | 5 | −169.616 | 1.00 | 1.84666 | 23.8 |
|  | 6 | 17.154 | 3.60 | 1.72342 | 38.0 |
|  | 7 | −11.383 | D7 |  |  |
| * | 8 | −40.544 | 3.10 | 1.52470 | 56.2 |
| * | 9 | −23.972 | 4.15 |  |  |
|  | 10 | −8.928 | 1.30 | 1.80420 | 46.5 |
|  | 11 | −41.797 |  |  |  |

TABLE 5

|     | W    | M     | T     |
| --- | ---- | ----- | ----- |
| D7  | 6.60 | 3.28  | 0.96  |
| f   | 24.7 | 34.8  | 48.5  |
| F   | 5.6  | 6.3   | 7.8   |
| FB  | 7.13 | 17.21 | 30.93 |
| ω   | 41.2 | 31.87 | 24.3  |

TABLE 6

| SUR. | K | A | B | C | D | E |
| --- | --- | --- | --- | --- | --- | --- |
| 3 | 3.90660E−02 | −9.56460E−05 | 1.55090E−06 | −1.55940E−07 | 7.36440E−09 | −6.14480E−11 |
| 4 | 1.72160E−01 | 1.84380E−04 | 9.48790E−07 | 8.72500E−08 | 2.04810E−09 | −1.79340E−10 |
| 8 | 1.31540E+00 | 3.37420E−05 | 2.06780E−06 | −2.43510E−08 | 5.83590E−10 | −7.26270E−12 |
| 9 | −4.46772E−01 | −7.23550E−05 | 1.06010E−06 | −3.85470E−08 | 8.42890E−10 | −8.76270E−12 |

EXAMPLE 3

Figure 4A:
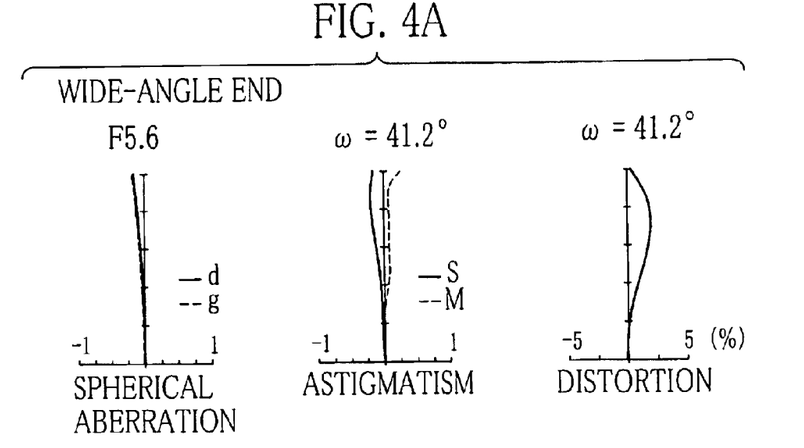
FIGS. 4A to 4C are aberration charts of Example 3.
Figure 4B:
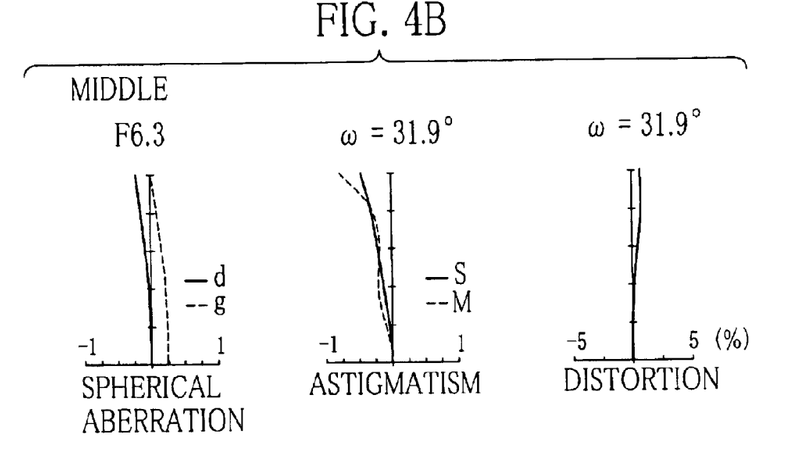
Figure 4C:
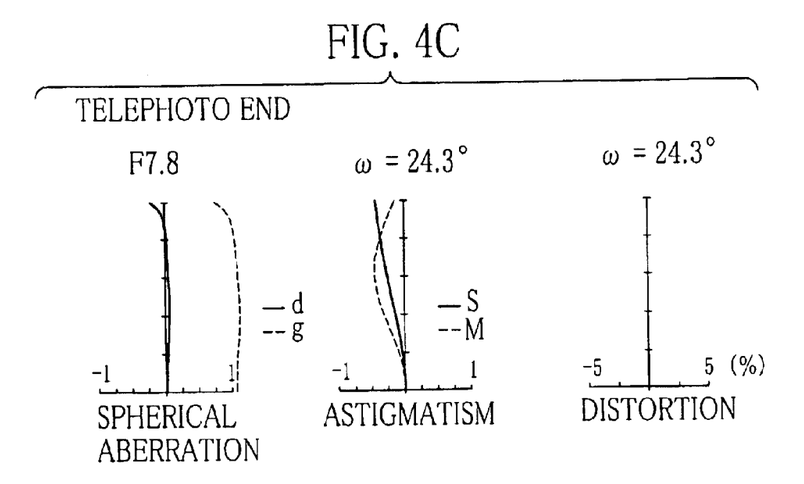

A zoom lens of Example 3 also has a similar structure with that of Example 1. Table 7 shows values of the respective lens surfaces of Example 3. Table 8 shows data of each zooming step, and Table 9 shows aspheric coefficients. Meanwhile, FIG. 1 shows sectional views of the lenses and FIG. 4 shows various aberrations of the respective zooming steps.

TABLE 7

| | SUR. | R | D | N | ν |
|---|---|---|---|---|---|
| | 1 | −31.119 | 0.90 | 1.76182 | 26.5 |
| | 2 | 15.269 | 0.15 | | |
| * | 3 | 12.051 | 3.00 | 1.68410 | 31.3 |
| * | 4 | −31.922 | 3.30 | | |
| | 5 | −133.555 | 1.00 | 1.84666 | 23.8 |
| | 6 | 16.670 | 3.60 | 1.72342 | 38.0 |
| | 7 | −11.346 | D7 | | |
| * | 8 | −31.000 | 3.10 | 1.52470 | 56.2 |
| * | 9 | −21.108 | 4.15 | | |
| | 10 | 8.709 | 1.30 | 1.80420 | 46.5 |
| | 11 | −39.469 | | | |

TABLE 8

| | W | M | T |
|---|---|---|---|
| D7 | 7.16 | 3.93 | 1.69 |
| f | 24.7 | 34.8 | 48.5 |
| F | 5.6 | 6.3 | 7.8 |
| FB | 6.33 | 15.88 | 28.90 |
| ω | 41.2 | 31.87 | 24.3 |

TABLE 9

| SUR. | K | A | B | C | D | E |
|---|---|---|---|---|---|---|
| 3 | −3.18760E−02 | −9.86090E−05 | 2.70010E−06 | −6.12650E−08 | 1.65550E−09 | −2.94320E−11 |
| 4 | 5.20132E−01 | 1.76940E−04 | 2.81580E−06 | 4.32210E−08 | 9.57040E−09 | −7.06740E−10 |
| 8 | 1.31540E+00 | 3.93500E−05 | 2.01920E−06 | −4.60440E−08 | 4.42810E−10 | −2.36730E−13 |
| 9 | −4.09474E−01 | −9.96530E−05 | 1.96160E−06 | −7.48700E−08 | 8.76600E−10 | −6.35980E−12 |

EXAMPLE 4

Figure 5A:
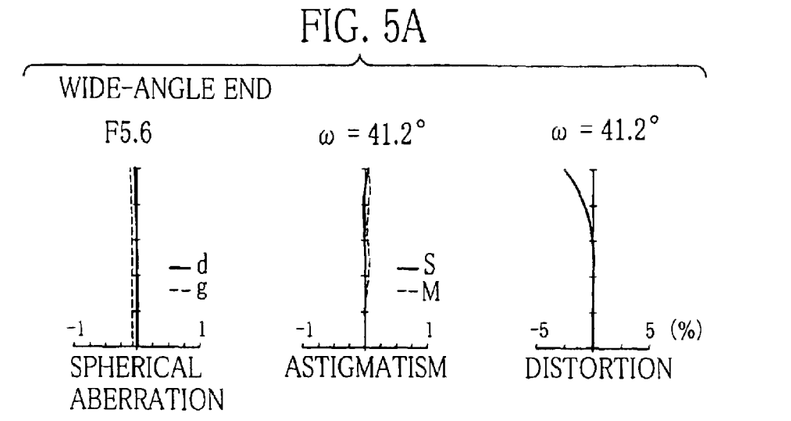
FIGS. 5A to 5C are aberration charts of Example 4.
Figure 5B:
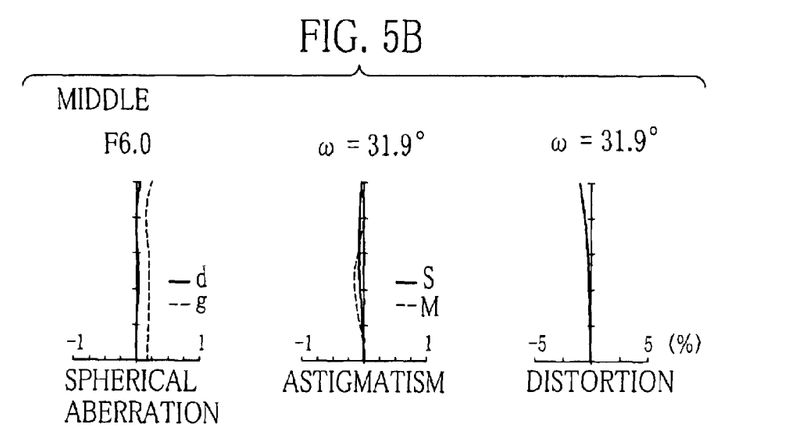
Figure 5C:
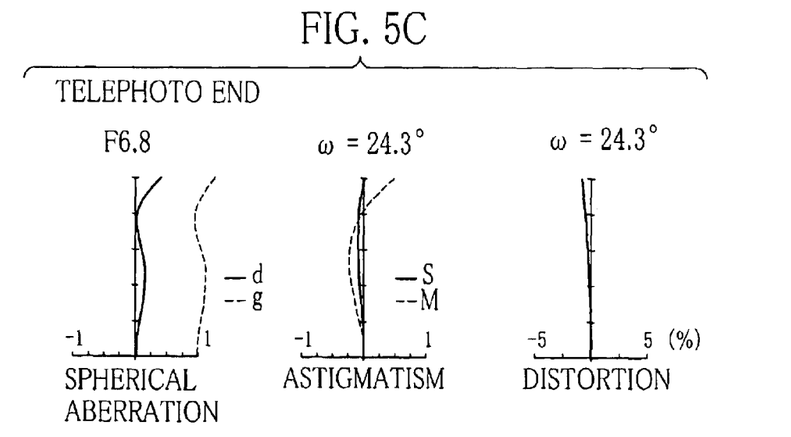

A zoom lens of Example 4 also has a similar structure with that of Example 1. Table 10 shows values of the respective lens surfaces of Example 4. Table 11 shows data of each zooming step, and Table 12 shows aspheric coefficients. Meanwhile, FIG. 1 shows sectional views of the lenses and FIG. 5 shows various aberrations of the respective zooming steps.

TABLE 10

| | SUR. | R | D | N | ν |
|---|---|---|---|---|---|
| | 1 | −21.283 | 0.90 | 1.72825 | 28.3 |
| | 2 | 11.559 | 0.15 | | |
| * | 3 | 10.403 | 3.00 | 1.68410 | 31.3 |
| * | 4 | −21.877 | 3.30 | | |
| | 5 | −150.218 | 1.00 | 1.84666 | 23.8 |
| | 6 | 15.344 | 3.60 | 1.72342 | 38.0 |
| | 7 | −11.345 | D7 | | |
| * | 8 | −52.443 | 3.10 | 1.52470 | 56.2 |
| * | 9 | −22.217 | 4.15 | | |
| | 10 | −8.9133 | 1.30 | 1.80420 | 46.5 |
| | 11 | −57.712 | | | |

TABLE 11

| | W | M | T |
|---|---|---|---|
| D7 | 6.57 | 3.18 | 0.83 |
| f | 24.7 | 34.8 | 48.5 |
| F | 5.6 | 6.0 | 6.8 |
| FB | 7.57 | 17.70 | 31.51 |
| ω | 41.2 | 31.87 | 24.3 |

TABLE 12

| SUR. | K | A | B | C | D | E |
|---|---|---|---|---|---|---|
| 3 | 1.50660E−02 | −1.22000E−04 | 1.91270E−06 | 4.06440E−08 | 1.19970E−08 | −2.82760E−10 |
| 4 | −1.48750E+00 | 1.62000E−04 | 1.06460E−06 | 1.91470E−07 | 1.03840E−08 | −2.07420E−10 |
| 8 | 1.31540E+00 | 1.38570E−05 | 2.18470E−06 | −3.85960E−08 | 2.96010E−10 | −1.07690E−12 |
| 9 | −2.37742E−01 | −1.14000E−04 | 1.84820E−06 | −6.70900E−08 | 9.11980E−10 | −7.86600E−12 |

EXAMPLE 5

Figure 6A:
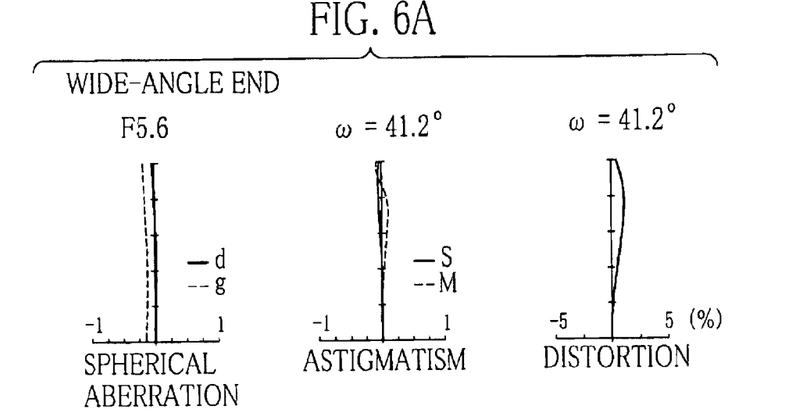
FIGS. 6A to 6C are aberration charts of Example 5.
Figure 6B:
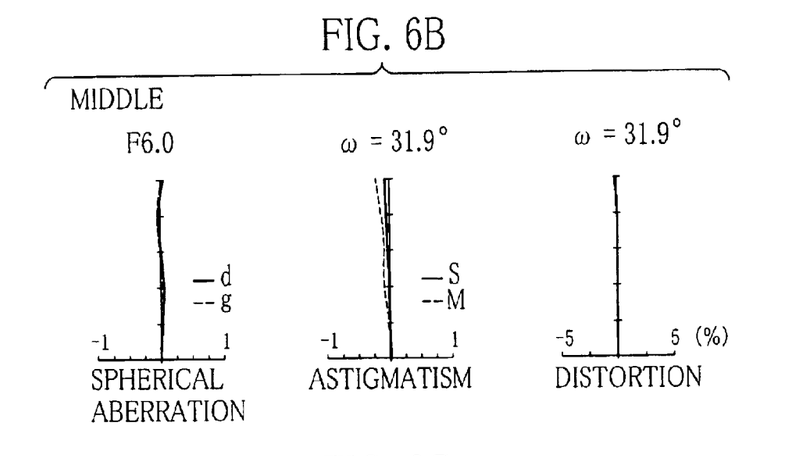
Figure 6C:
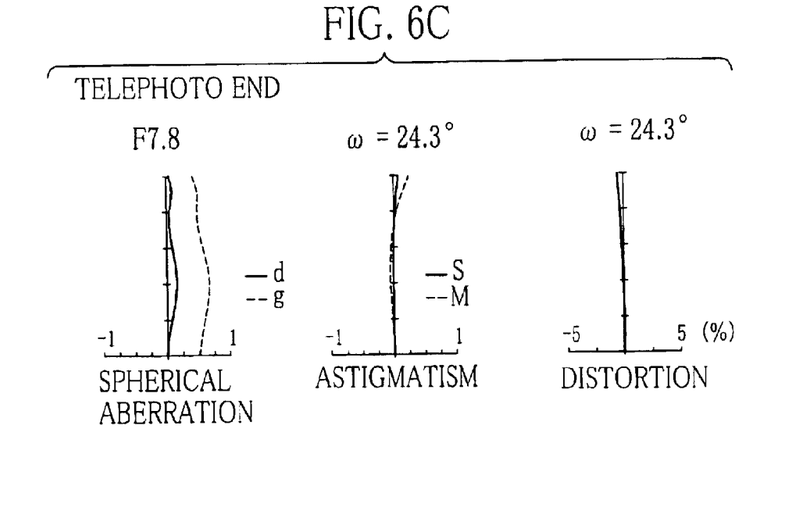

A zoom lens of Example 5 also has a similar structure with that of Example 1. Table 13 shows values of the respective lens surfaces of Example 5. Table 14 shows data of each zooming step, and Table 15 shows aspheric coefficients. Meanwhile, FIG. 1 shows sectional views of the lenses and FIG. 6 shows various aberrations of the respective zooming steps.

TABLE 13

| SUR. | R | D | N | ν |
|---|---|---|---|---|
| 1 | −20.500 | 0.90 | 1.72825 | 28.3 |
| 2 | 11.881 | 0.15 | | |
| *3 | 10.542 | 3.00 | 1.68893 | 31.1 |
| *4 | −18.905 | 3.30 | | |
| 5 | −109.929 | 1.00 | 1.84666 | 23.8 |
| 6 | 16.542 | 3.60 | 1.72342 | 38.0 |
| 7 | −12.047 | D7 | | |
| *8 | −41.450 | 3.10 | 1.52470 | 56.2 |
| *9 | −19.684 | 4.15 | | |
| 10 | −8.659 | 1.30 | 1.7725 | 49.6 |
| 11 | −55.009 | | | |

TABLE 14

| | W | M | T |
|---|---|---|---|
| D7 | 6.82 | 3.25 | 0.77 |
| f | 24.7 | 34.8 | 48.5 |
| F | 5.6 | 6.0 | 7.8 |
| FB | 7.06 | 17.20 | 30.99 |
| ω | 41.2 | 31.87 | 24.3 |

TABLE 15

| SUR. | K | A | B | C | D | E |
|---|---|---|---|---|---|---|
| 3 | −4.77818E−01 | −0.33103E−04 | 9.30710E−06 | −9.15470E−07 | 3.92290E−08 | −4.86660E−10 |
| 4 | 5.08748E−01 | 1.25269E−04 | −6.30970E−07 | 5.28180E−07 | −4.21550E−08 | 1.16790E−09 |
| 8 | 1.31540E+00 | 3.37730E−05 | 9.49270E−07 | −2.39840E−08 | 5.51710E−10 | −3.75680E−12 |
| 9 | 5.00299E−01 | −8.10850E−05 | 6.35840E−07 | −4.65700E−08 | 7.52740E−10 | −6.55580E−12 |

EXAMPLE 6

Figure 7A:
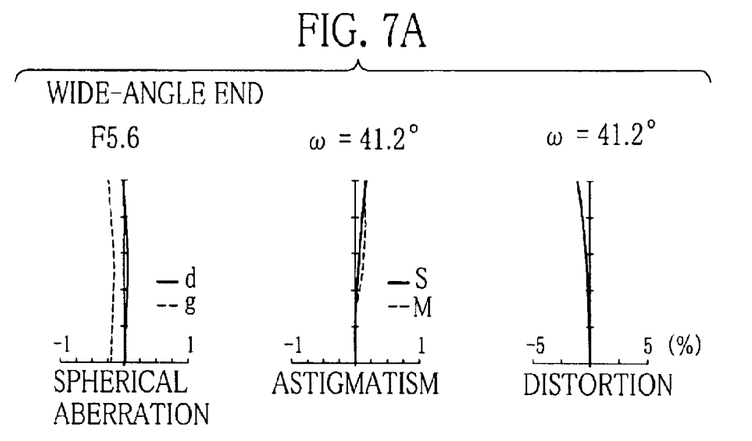
FIGS. 7A to 7C are aberration charts of Example 6.
Figure 7B:
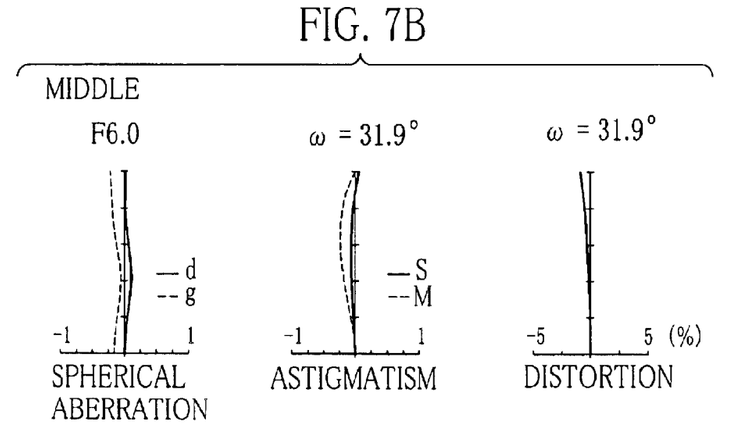
Figure 7C:
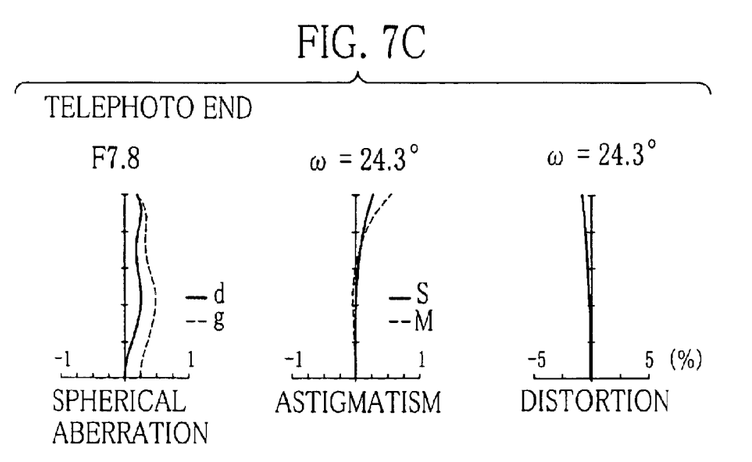

A zoom lens of Example 6 also has a similar structure with that of Example 1. Table 16 shows values of the respective lens surfaces of Example 6. Table 17 shows data of each zooming step, and Table 18 shows aspheric coefficients. Meanwhile, FIG. 1 shows sectional views of the lenses and FIG. 7 shows various aberrations of the respective zooming steps.

TABLE 16

| SUR. | R | D | N | ν |
|---|---|---|---|---|
| 1 | −15.000 | 0.90 | 1.72825 | 28.3 |
| 2 | 14.617 | 0.15 | | |
| *3 | 12.104 | 3.00 | 1.68893 | 31.1 |
| *4 | −15.304 | 3.30 | | |
| 5 | −187.376 | 1.00 | 1.84666 | 23.8 |
| 6 | 17.478 | 3.60 | 1.72342 | 38.0 |
| 7 | −13.473 | D7 | | |
| *8 | −62.488 | 3.10 | 1.52470 | 56.2 |
| *9 | −22.448 | 4.15 | | |
| 10 | −9.827 | 1.30 | 1.7725 | 49.6 |
| 11 | −121.751 | | | |

TABLE 17

| | W | M | T |
|---|---|---|---|
| D7 | 7.42 | 3.45 | 0.69 |
| f | 24.7 | 34.8 | 48.5 |
| F | 5.6 | 6.0 | 7.8 |
| FB | 6.97 | 17.44 | 31.69 |
| ω | 41.2 | 31.87 | 24.3 |

TABLE 18

| SUR. | K | A | B | C | D | E |
|---|---|---|---|---|---|---|
| 4 | 2.64070E−02 | −2.08580E−04 | 9.79990E−06 | −1.13940E−06 | 5.13620E−08 | −8.28130E−10 |
| 5 | 3.26841E−01 | 9.92640E−05 | −3.88590E−06 | 6.86810E−07 | −5.31000E−08 | 1.34420E−09 |
| 8 | 1.31540E+00 | 2.98280E−05 | −3.23970E−07 | −4.73040E−09 | 5.16190E−10 | −4.31130E−12 |
| 9 | 8.87740E−01 | −5.45060E−05 | 1.62210E−07 | −3.00280E−08 | 5.51890E−10 | −2.93500E−12 |

Table 19 shows values of the conditions (1) to (3) of the respective Examples.

TABLE 19

| | EX. 1 | EX. 2 | EX. 3 | EX. 4 | EX. 5 | EX. 6 |
|---|---|---|---|---|---|---|
| (1) fs/f1 | −2.13 | −2.17 | −1.85 | −2.43 | −2.42 | −2.46 |
| (2) f1/f2 | −1.00 | −0.98 | −1.01 | −0.95 | −0.99 | −0.97 |
| (3) r1/f1 | 2.37 | 2.44 | 2.33 | 2.09 | 2.01 | 1.49 |

Incidentally, the compact wide-angle zoom lens of the present invention is not exclusive to the above embodiments.

It is possible to adequately select the shapes, the materials, the aspheric coefficients and so forth of the respective lenses.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A zoom lens system comprising, in order from an object side, a first lens group having a positive refracting power and a second lens group having a negative refracting power, magnification being changed from a wide-angle end to a telephoto end by moving the first and second lens groups toward the object side and by reducing an interval between the first and second lens groups, said first lens group comprising, in order from the object side:

a first lens having a negative refracting power, a concave surface of said first lens being directed to the object side;

a second lens having a positive refracting power;

a third lens having a negative refracting power; and a fourth lens having a positive refracting power, wherein said zoom lens system satisfies the following conditions:

$$-2.7 < fs/f1 < -1.7$$

$$-1.1 < f1/f2 < -0.9$$

where fs denotes a focal length of the zoom lens system at the wide-angle end, f1 denotes a focal length of the first lens, and f2 denotes a focal length of the second lens.

2. A zoom lens system according to claim 1, wherein the following condition is further satisfied:

$$1.0 < r1/f1 < 3.0$$

where r1 denotes a radius of curvature regarding the object side of said first lens.

3. A zoom lens system according to claim 2, wherein the following condition is further satisfied:

$$N1 > N2$$

where N1 and N2 are refractive indexes of the first lens and the second lens respectively.

4. A zoom lens system according to claim 1, wherein both surfaces of the second lens are convex surfaces, and at least one of the surfaces is an aspheric glass lens.

5. A zoom lens system according to claim 4, wherein said second lens has a refractive index of 1.6 or more.

6. A zoom lens system according to claim 1, wherein said third lens and said fourth lens are a cemented lens.

7. A zoom lens system according to claim 6, wherein said third and fourth lenses satisfy the following conditions:

$$v3 < v4$$

$$N3 > N4$$

where v3 and v4 denote Abbe numbers of the third lens and the fourth lens respectively, and N3 and N4 denote refractive indexes of the third lens and the fourth lens respectively.

8. A zoom lens system according to claim 1, wherein said second lens group comprises, in order from the object side:

a fifth lens having a positive refracting power; and a sixth lens having a negative refracting power.

9. A zoom lens system according to claim 8, wherein an Abbe number of said fifth lens is 40 or more.

10. A zoom lens system according to claim 8, wherein said fifth lens is a plastic lens.

* * * * *